(No Model.)
J. F. STEWARD.
GRAIN HARVESTER.
No. 474,700. Patented May 10, 1892.
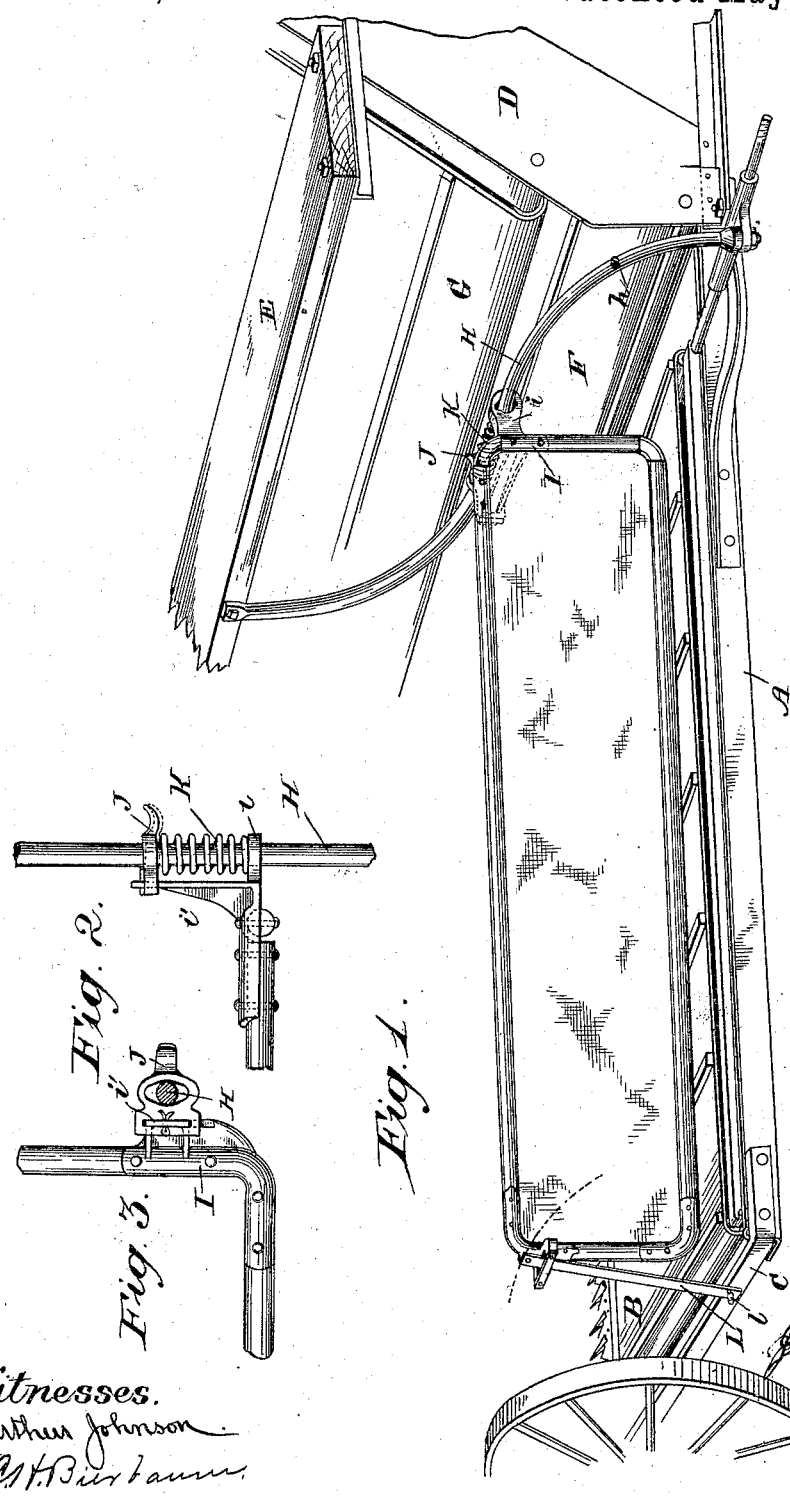
Witnesses.
Arthur Johnson
Inventor.
John F. Steward

UNITED STATES PATENT OFFICE.

JOHN F. STEWARD, OF CHICAGO, ILLINOIS.

GRAIN-HARVESTER.

SPECIFICATION forming part of Letters Patent No. 474,700, dated May 10, 1892.

Application filed December 7, 1891. Serial No. 414,234. (No model.)

*To all whom it may concern:*

Be it known that I, JOHN F. STEWARD, of Chicago, in the county of Cook and State of Illinois, have invented certain new and useful Improvements in Grain-Harvesters, of which the following is a full description, reference being had to the accompanying drawings, in which—

Figure 1 is a rear perspective view of the "flag" or adjustable backboard, and Figs. 2 and 3 details of the hinge which forms means for connecting the adjustable backboard to the main frame of the harvesting-machine.

In the drawings, A is the rear platform-sill of an ordinary harvesting-machine, and B the traveling canvas, properly supported on rollers journaled on the platform in the rear of the cutting apparatus, and thus adapted to convey the grain stubbleward to the elevating devices.

C is the outer portion of the platform-frame.

D is the elevator-frame, and E the seat-board.

F and G are the endless elevating-canvases.

My improvement is shown adapted to a platform-conveyer narrower than the elevating devices and as adapted to turn down to an inclined or even horizontal position, and thus form a rearward extension of the platform, if desired, over which the heads of long grain may move. To the rear portion of the platform-frame I fit a curved bar H, preferably shouldering its lower end and passing it through a hole in the frame or in some part secured to the frame, and having a nut at its extreme end adapted to draw the shoulder tightly against the support for the bar. This bar starts substantially vertically upward at its lowermost end and gradually curves forward, so as to assume a horizontal direction for a distance, in which direction it may terminate or pass onward to some part of the machine; but from preference I direct it upward and secure it to the seat-board. I have not shown the horizontal part of the bar of any great length, because it is not necessary, where the provision is made for the flag to turn down, to have much actual horizontal adjustment.

I prefer to make the flag-frame of four round bars formed into a parallelogram having metal corner-pieces. Over this frame is tightly drawn and secured a canvas. To the upper stubbleward corner of the flag I secure the corner-piece I, having the lug $i$ formed into an eye that may slide on the bar H. For convenience of securement of the bar H to the seat-board I flatten it and so slot the eye in the lug $i$ that it may pass over the flattened portion of the bar in putting the parts of the device together. I extend a portion $i'$ preferably in a forward direction. Adapted to slide on the rod H is also a friction-latch J, having an eye that fits the bar somewhat closely in a transverse direction, but vertically slotted to permit it to pass over the flattened end of the bar H. The latch is also provided with a slotted eye adapted to pass onto the forward end of the extension $i'$ and be there held by a spring-cotter, the slot and extension, however, being so loosely fitted that the latch J may be rocked thereon. Between the latch J and the lug $i$ is the spring K, preferably surrounding the bar H and adapted to force the latch J forward and cause it to cramp onto the bar, the whole constituting, as stated, a friction-latch. If an attempt be made to slide the flag forward, the spring gives way and allows the friction to force the latch free to a sufficient extent to permit forward adjustment. If it be desired to move the flag rearward, the latch J may be grasped at its outer curved portion and drawn backward, such action freeing it from its cramping position on the rod and thus permitting the whole to move. It will be seen that the flag is so jointed to the supporting-bar H that it may be swung to a vertical position, as well as adjusted along the rod. It is not always desirable, even in the longest grain, to move the flag so far rearward as to turn it to a horizontal position. In fact, I have found that even in the longest rye such position is not best, and hence I provide a stop $h$, which prevents full prostration of the flag. The stop is but a key, however, and may be removed if the operator prefers to prostrate his flag.

In order that the outer end of the flag may be held off from the conveying-canvas, I provide the support L, which I pivot to the upper corner of the flag and also to the bar C of the platform-sill. The support L is limited in its movement at its upper end by a slot formed in the corner-piece. The pivotpin L' is simply a stud projecting from the bar C, from which by swinging to the left the support may be withdrawn, and upon which withdrawal the flag may be folded up for convenience of getting at the platform-canvas to tighten it or for other purposes. With the latch J held in a cramping position by any means I find that it is not necessary to notch the bar H so that the latch may engage it aggressively; but other means than the spring K may be resorted to for holding the latch in its cramping position.

What I claim as my invention, and desire to secure by Letters Patent, is—

1. In a harvesting-machine, a support overlying the space of grain-travel at the delivery end of the platform, a backboard adapted to slide thereon and also be folded upward thereon, and a detachable support at the outer end of said backboard that will permit said end to move fore and aft as the backboard is adjusted along the supporting-slide at the delivery end of grain-travel and will also permit it to be raised, all combined substantially as described.

2. In a harvesting-machine, a slide overlying the grain-delivering canvas at its delivery end and so supported that the grain may travel therebeneath, said support deflected downwardly at its rear end, a backboard supported and adapted to move on said slide and thus permit of fore-and-aft adjustment of the said backboard and also permit the latter to turn downwardly and form a rearward extension of the delivery-platform, also so supported that its outer end may be sustained, substantially as described.

3. In a harvesting-machine, a backboard-supporting guide, in combination with a backboard supported on said guide by means, substantially as described, that permit of a fore-and-aft movement of the said backboard and also permit the said backboard to be folded upward, substantially as set forth.

4. In a harvesting-machine, a backboard supporting and controlling device, consisting of the bar H, the backboard adapted to slide on the said supporting-bar by means of a corner-piece provided with an eye $i$, and a clutch J to engage the bar H and hold the backboard in adjustment, and said backboard supported at its outer end by means substantially such as described, whereby the said end may be free to move fore and aft simultaneously with the adjustment of the delivery end of the said backboard, all combined substantially as described.

5. In a harvesting-machine, a backboard supporting and controlling device, consisting of the bar H, the backboard adapted to slide on the said supporting-bar by means of a corner-piece provided with an eye $i$, and spring-pressed clutch J to hold the backboard in adjustment, said backboard being supported at its outer end by means substantially such as described, whereby said end may be free to move fore and aft simultaneously with the adjustment of the delivery end of the said backboard, all combined substantially as set forth.

JOHN F. STEWARD.

Witnesses:
 ELISE M. HALVERSON,
 ARTHUR JOHNSON.